L. W. Fifield,

Lifting Jack

No. 101,450.  Patented Apr. 5, 1870

Witnesses
A. Brown
J. G. Arnold

Levi W. Fifield, Inventor

United States Patent Office.

LEVI W. FIFIELD, OF WORCESTER, MASSACHUSETTS, ASSIGNOR TO ENOCH EARLE AND LUKE K. DAVIS, OF SAME PLACE.

Letters Patent No. 101,450, dated April 5, 1870.

IMPROVED LIFTING-JACK.

The Schedule referred to in these Letters Patent and making part of the same.

I, LEVI W. FIFIELD, of the city and county of Worcester, State of Massachusetts, have invented certain Improvements in Lifting-Jacks, of which the following is a specification.

Nature and Objects of my Invention.

My invention is designed to meet a common want in furnishing a handy, ready means of raising wheels by their axles, and similar purposes, and having an arrangement for adjusting it easily to various heights, as required.

Description of the Accompanying Drawings.

Figure 1:
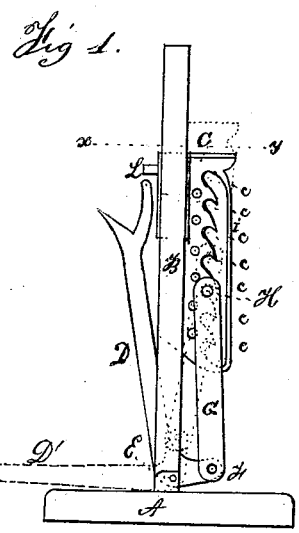
Figure 1 is a side view of a machine embodying my invention.
Figure 2:
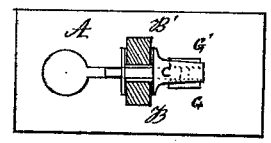
Figure 2 shows a section at the line $x\,y$, as seen from above.

General Description.

A is the base supporting the standards B B', between which plays the slide C and the lever D, the latter turning on a stationary pin or fulcrum at E, and having its short end at F connected by the pieces G G' to a pin, H, which catches in the notches $c\,c\,c\,c\,c$ in the slide C, the guard I preventing the pin from falling away, and allowing the shifting of the pin into any of the notches, thus adjusting the slide to various heights, the lever D being so arranged with the connections G G' that when it is depressed, as at D', the joint F shall pass a line from the fulcrum at E to the pin H, thus supporting any weight that may be lifted by C.

The upper end of D is made with a handle and foot-pad, so as to be operated by either or both.

The slide C has a stud or handle at Z to facilitate its adjustment.

I claim—

The combination and arrangement of the lever D, having a stationary fulcrum, the connections G, pin H, and adjustable slide C, operating in the manner and for the purpose above set forth.

LEVI W. FIFIELD.

Witnesses:
A. BROWN,
J. G. ARNALL.